United States Patent

Brenneke

[15] 3,697,090
[45] Oct. 10, 1972

[54] PLASTICS FILLED PISTON RING
[72] Inventor: Arthur M. Brenneke, New Castle, Ind.
[73] Assignee: TRW Inc., Cleveland, Ohio
[22] Filed: June 29, 1970
[21] Appl. No.: 50,677

[52] U.S. Cl. ................277/157, 277/164, 277/228
[51] Int. Cl. ..............................................F16j 15/16
[58] Field of Search......277/231, 223, 228, 235, 138, 277/139, 140, 164, 165, 3, 9, 9.5, 11, 12, 157; 92/182, 254

[56] References Cited

UNITED STATES PATENTS

| | | | |
|---|---|---|---|
| 2,296,334 | 9/1942 | Bowers | 277/223 |
| 2,908,537 | 10/1959 | Kipp | 277/DIG. 6 |
| 2,807,511 | 9/1957 | Fleming | 277/DIG. 6 |
| 3,174,763 | 3/1965 | Hamm | 277/235 X |
| 1,716,900 | 6/1929 | Rash | 92/254 |
| 1,736,252 | 11/1929 | Clark | 92/254 |

*Primary Examiner*—William F. O'Dea
*Assistant Examiner*—Robert I. Smith
*Attorney*—Hill, Sherman, Meroni, Gross & Simpson

[57] ABSTRACT

A compression piston ring composed of a segmented circumferentially expansible metal ring and an elastomeric plastic ring, preferably a fluorocarbon plastic ring, anchored to and supported by the metal ring and providing a peripheral sealing surface conforming with and riding on the cylinder in which the piston operates. The elastomeric plastic material is oil resistant, has a low coefficient of friction, and retains its integrity under the operating conditions existing in an internal combustion engine. The plastics material is preferably injected into the segmented metal ring to fill all voids of the metal ring, eliminating all gap leakage, and insuring low blowby, minimized air pollution, and oil oxidation.

12 Claims, 16 Drawing Figures

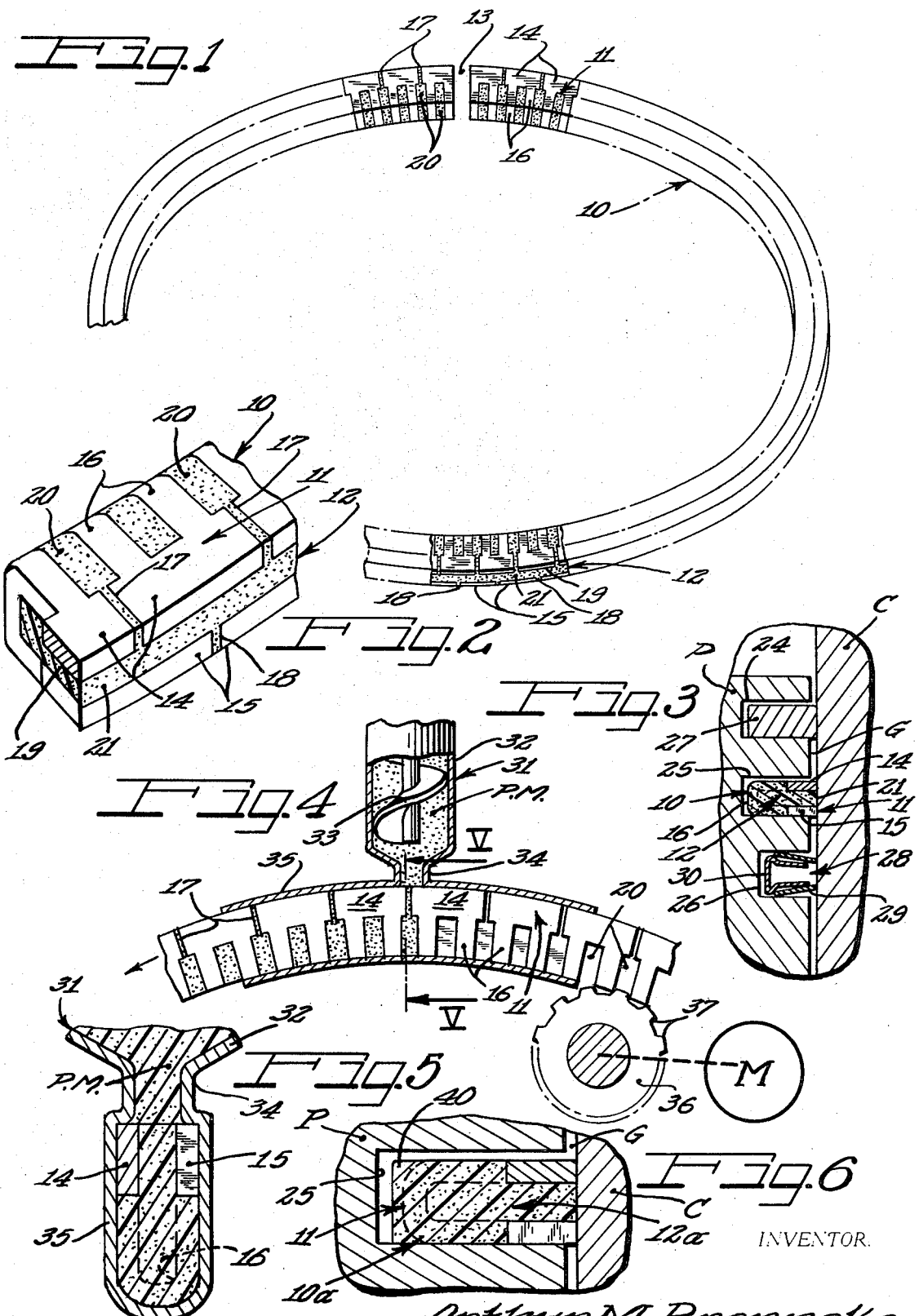

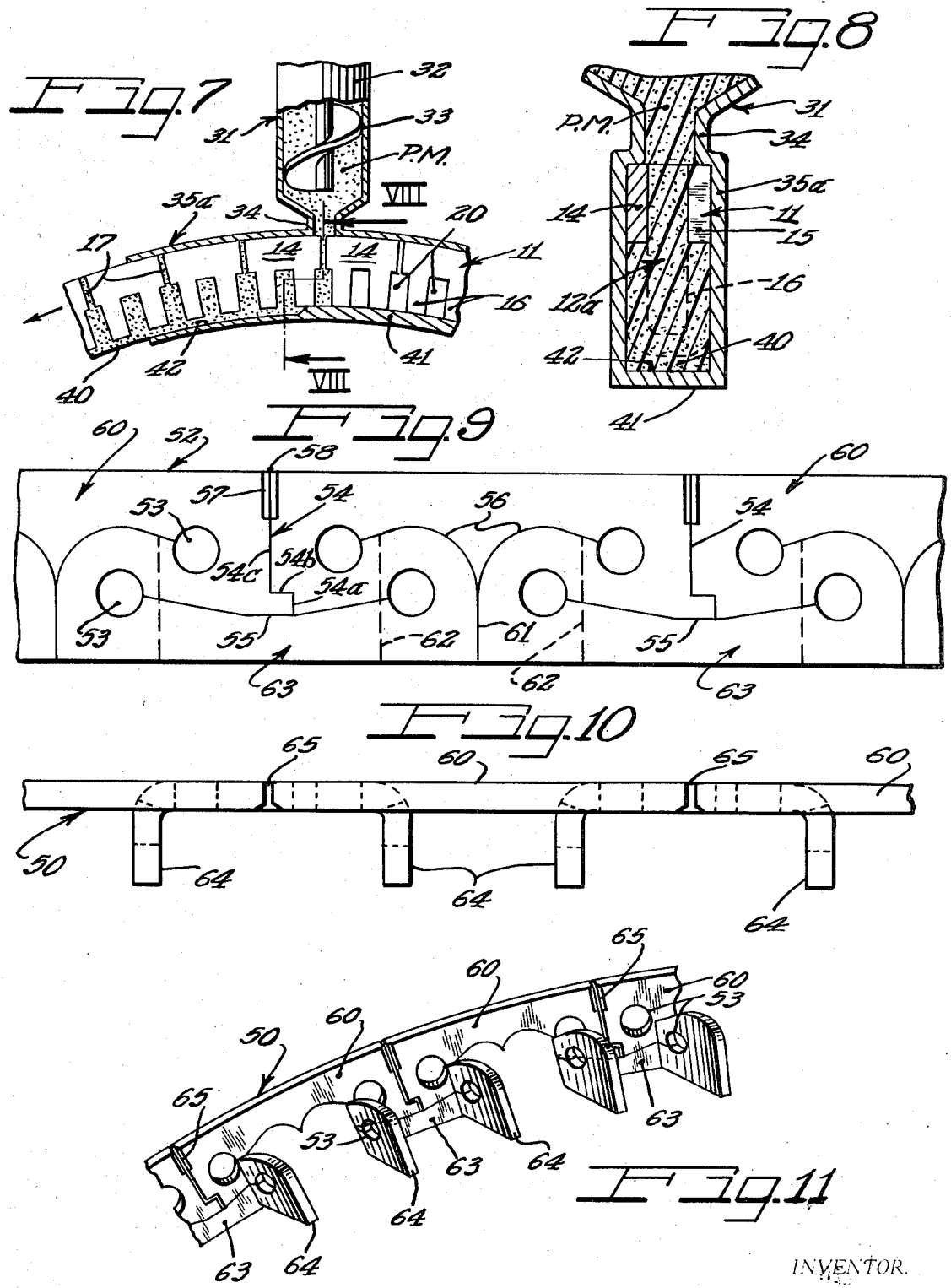

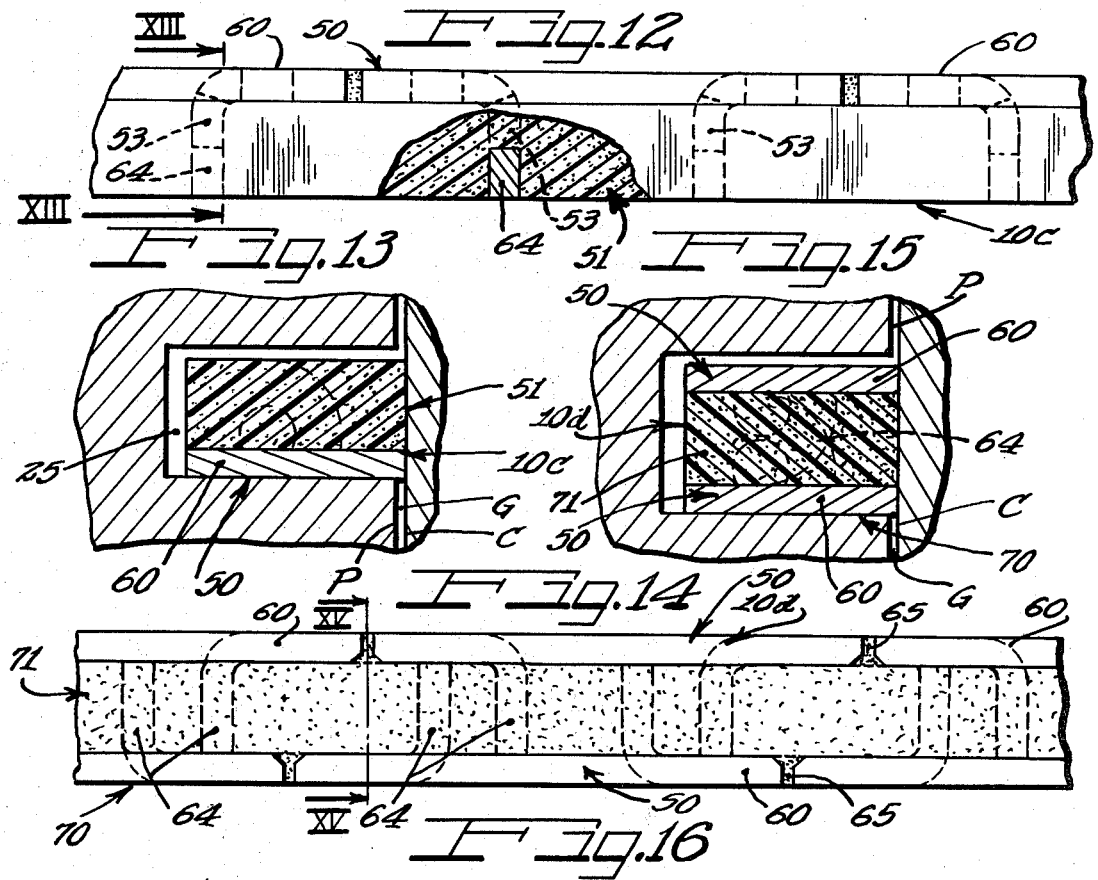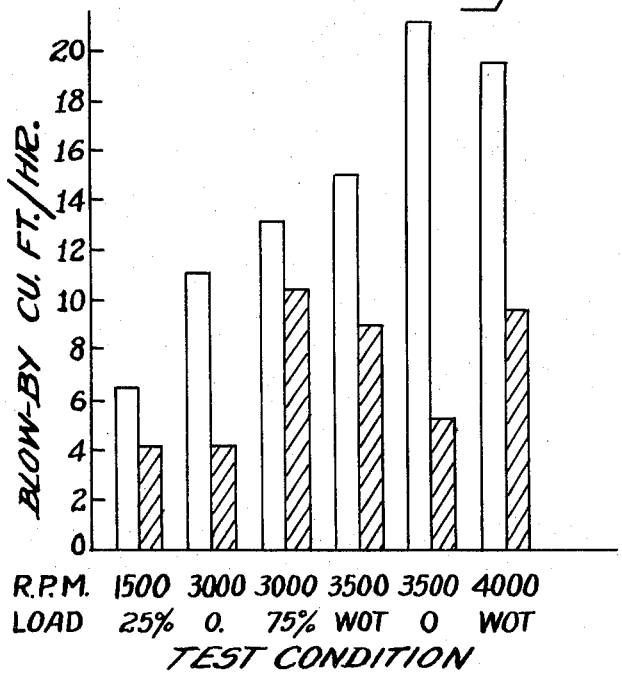

PLASTICS FILLED PISTON RING

BACKGROUND OF THE INVENTION

1. Field of the Invention

This invention relates to the art of packing or piston rings, and particularly to a compression piston ring for the second ring groove of an internal combustion engine piston having an elastomeric plastic sealing ring anchored to and supported by a segmented circumferentially expansible metal ring.

2. Description of the Prior Art

The segmented circumferentially expansible metal rings such as disclosed in the Bowers U.S. Pat. No. 2,224,338 have been limited for use as oil control rings or oil scraping rings in engine piston and cylinder assemblies because they are incapable of sealing against the pressures that exist at the compression ring area of the piston. Sealing of the gaps in such rings with plastics material has been disclosed in the Knocke U.S. Pat. No. 3,053,545, but such gap sealed rings do not provide a plastic sealing face riding on the cylinder wall and are not intended for use as compression rings.

SUMMARY OF THE INVENTION

According to this invention there is provided an elastomeric plastics ring supported by and anchored to a segmented circumferentially expansible metal ring useful as a second compression ring in an internal combustion engine piston and cylinder assembly. The compression rings of this invention present a peripheral band of elastomeric plastic to the cylinder wall forming a conformable sealing face. The elastomeric plastic material is supported by and anchored to a metal ring which will not interfere with the conforming of the plastic to the cylinder wall and at the same time will circumferentially expand the periphery of the plastics ring into good sealing contact with the cylinder wall. The metal prevents extrusion of the plastics material under the high compression loads existing in the gap between the piston and cylinder in high compression engines. The elastomeric plastics material has a low coefficient of friction, is resistant to oil and engine temperatures and corrosion conditions prevailing in the engine and will retain its integrity under all operating conditions of the engine. The plastics material is preferably injected into all voids of the segmented circumferentially expansible metal ring and is integrally secured to the metal.

Any elastomeric plastics material capable of maintaining its integrity under engine operating conditions may be used, including polyolefinic polymers, preferably fluorocarbons, such as Viton (DuPont Tradename), polytetrafluoroethylene (Teflon), chlorotrifluoroethylene (Kel-f), vinylidene fluoride, hexafluoropropylene, and vinyl fluoride, aromatic polyimids such as Vespel (DuPont Tradename), silicones such as Silastic (Dow Chemical Corporation Tradename) and the like.

The rings of this invention present a continuous sealing band surface of elastomer to the cylinder wall. This surface has a low coefficient of friction and adapts itself to any cylinder irregularities so that a wear-in or break-in period of engine operation is not necessary. The segmented circumferentially expansible metal ring exerts a radial expansion force on the plastics ring, pressing it against the cylinder wall with the desired sealing load and, in addition, firmly supports the plastics material so that it will not be deformed into any gap between the piston and cylinder and so that it will not deform in the piston groove. The periphery of the metal ring also engages the cylinder wall with the plastics ring to cooperate therewith in forming the seal, and since this ring is segmented it, too, will readily conform with the cylinder wall.

It is then an object of this invention to provide a compression piston ring for internal combustion engine piston and cylinder assemblies composed of an elastomeric plastic ring anchored to and supported by a segmented circumferentially expansible metal ring.

Another object of this invention is to provide an oil ring type circumferentially expansible piston ring with an elastomeric plastics filling sealing all voids in the ring and presenting a circumferential continuous sealing face to the cylinder wall.

A still further object of this invention is to provide an integrated metal and plastics piston ring suitable for use in the second compression ring groove of a piston.

Another object of this invention is to provide an elastomeric plastics piston ring anchored to and supported by a circumferentially expansible segmented metal ring effective to expand the plastics ring into conformity with an engine cylinder to form an effective seal on the cylinder wall.

A specific object of this invention is to provide an integrated metal and plastics compression ring having a fluorocarbon sealing ring portion encased in a circumferentially expansible segmented metal ring portion.

Another object of this invention is to provide a method of making an integrated plastics and metal piston ring suitable for a compression ring in an internal combustion engine piston and cylinder assembly.

Another object of this invention is to provide a method of manufacturing a fluorocarbon plastics filled segmented channel type circumferentially expansible metal piston ring.

A still further object of the invention is to provide a method of manufacturing an elastomer plastics piston ring encased in a circumferentially expansible segmented metal piston ring.

Other and further objects of this invention will become apparent to those skilled in this art from the following detailed description of the annexed sheets of drawings which, by way of examples only, illustrate several embodiments of the invention.

BRIEF DESCRIPTION OF THE DRAWINGS

FIG. 1 is a perspective view of a compression piston ring of this invention;

FIG. 2 is an enlarged cross-sectional fragmentary perspective view of the ring of FIG. 1 showing the filling of all voids of the metal ring with the plastics material;

FIG. 3 is a fragmentary cross-sectional view of a piston and cylinder assembly having the ring of FIGS. 1 and 2 mounted in the second ring groove to provide a compression ring;

FIG. 4 is a fragmentary diagrammatic view of an apparatus for making the ring of FIGS. 1 and 2;

FIG. 5 is a cross-sectional view taken along the line V—V of FIG. 4;

FIG. 6 is a view similar to FIG. 3 but illustrating a modified second ring groove compression ring according to this invention;

FIG. 7 is a view similar to FIG. 4 but illustrating apparatus for making the modified ring of FIG. 6;

FIG. 8 is a transverse sectional view taken along the line VIII—VIII of FIG. 7;

FIG. 9 is a plan view of a strip of metal punched to form a modified circumferential expansion ring for a modified compression ring of this invention;

FIG. 10 is a longitudinal edge view of the strip of FIG. 9 after a bending operation thereon;

FIG. 11 is a fragmentary perspective view of the circumferentially expansible ring formed from the strip of FIGS. 9 and 10;

FIG. 12 is a peripheral face view of a plastics filled compression ring formed from the ring of FIG. 11;

FIG. 13 is a cross-sectional view along the line XIII—XIII of FIG. 12 showing the ring in the second compression ring groove of a piston in a piston and cylinder assembly;

FIG. 14 is a peripheral face view of a still further modified ring of this invention;

FIG. 15 is a transverse sectional view along the line XV—XV of FIG. 14 and showing the ring mounted in the second compression ring groove of a piston and cylinder assembly; and FIG. 16 is a chart comparing the blow-by control provided by the rings of this invention with a standard second groove compression ring.

DESCRIPTION OF THE PREFERRED EMBODIMENTS

The piston ring 10 of FIGS. 1–3 includes a sheet steel segmented circumferentially expansible channel type ring 11 of the type shown, for example, in the aforesaid Bowers U.S. Pat. No. 2,224,338, and an elastomeric plastics ring 12 encased by the ring 11 and filling all voids of the ring. The ring 10 is split at 13 and in operation has its split ends abutted together.

The ring portion 11 has a top row of circumferentially separated radially extending ring segments 14 and a bottom row of similar segments 15 connected in parallel axially spaced relation by circumferentially spaced axially extending legs 16 around the inner periphery of the ring. Each segment 14 and 15 has two such legs 16 with each leg extending from a segment in one row to an adjacent segment in the other row. The segments in the two rows are thereby in staggered relation to each other, and the radial gaps 17 between the segments 14 of the top row are thus circumferentially offset from the gaps 18 between the segments 15 in the bottom row.

The ring 11 has an outwardly opening channel 19 and spaces or gaps 20 between the legs 16 expose this channel to the interior of the ring.

The channel 19 and the spaces or voids 20, as well as the gaps 17 and 18 are filled with the elastomeric plastics ring 12 and, as shown in FIGS. 2 and 3, this ring presents a cylindrical peripheral sealing face 21 between peripheral edges 22 and 23 provided by the segments 14 and 15. The plastic ring face 21 is flush with the edges 22 and 23 and, as shown in FIG. 2, the plastic of the ring 12 fills and is keyed in the voids 20 and gaps 17 and 18 to extend flush with the top and bottom surfaces and the back wall of the ring 11.

The ring 12 is thus encased in the ring 11 and has a fully exposed outer peripheral face 21 forming the sealing surface in the piston and engine assembly shown in FIG. 3 where the piston P rides in the bore of a cylinder C and has a top compression ring groove 24, a second compression ring groove 25 and an oil ring groove 26. A conventional split cast iron compression ring 27 is seated in the top grove 24, the ring 10 of this invention is seated in the groove 25 and a conventional oil ring assembly 28 is provided in the oil groove 26. The assembly 28 includes thin rail rings 29 supported on a spacer-expander ring 30.

The ring 10 in the second compression ring groove 25 of the piston P is subjected to higher temperatures and grater pressures than the oil ring 28 in the ring groove 26, and the plastics component 12 of this ring 10 is fully protected against deformation or extrusion either in the gap between the piston and the cylinder or in the ring groove by the metal ring component 11. The top and bottom ring segments 14 and 15 of this component 11 bridge the gap G between the piston and the cylinder and thus protect the plastics ring 12 against deformation in this space. Likewise, these segments 14 and 15 and the back-up legs 16 of the ring component 11 prevent deformation of the plastics ring component 12 in the ring groove 25. The ring 10, of course, has its split ends abutted together and is contracted in its operative position in the piston and cylinder assembly so that the metal component 11 of the ring exerts a circumferential expansion force on the plastics ring component 12, urging the peripheral face 21 thereof into good sealing contact with the cylinder wall. Since both the metal component 11 and the plastics component 12 of the ring 10 are flexible, the sealing face 21 readily adapts to the contour of the cylinder bore and an effective seal is established without a "break-in" period of operation. In general, the plastics material of the ring component 12 must be capable of resisting temperatures in excess of 450° F. without softening or in any way losing its sealing integrity. In addition, of course, the plastics ring must be resistant to oil and the corrosion atmosphere in the operating internal combustion engine. Since the plastics ring is encased by the metal ring, it will, of course, resist very high blowby pressures.

The ring 10 is conveniently formed in a crosshead extrusion apparatus 31 illustrated in FIGS. 4 and 5. The apparatus 31 includes a supply tube 32 with a screw feeder 33 forcing powdered plastics material P.M. through an orifice 34 to a crosshead channel 35 sized and shaped to receive the metal component 11 in an upright position therethrough with the ring segments 14 and 15 riding on the side walls of the channel and the legs 16 riding on the curved bottom of the channel. The crosshead 35 thus defines a tunnel snugly receiving the ring component 11 therethrough with its channel 19 opening upwardly to receive the plastics material from the orifice 34. The ring component 11 may conveniently be fed through the crosshead 35 by a feed wheel 36 having teeth 37 meshing in the gaps 20 between the legs 16 and driven by a motor M as shown in FIG. 4.

The powdered or granular plastics material P.M. is forced under high pressure, such as 3,000–5,000 p. s. i., into the channel 19 of the ring 11 as the ring is advanced through the crosshead 35 filling the entire channel 19 as well as the gaps 20 between the legs 16 and the radial gaps 17 and 18 between the segments 14 and 15.

The plastics filled ring 10 is heated to temperatures which do not exceed the temperatures at which the steel component 11 of the ring has been subjected in previous tempering treatment. For example, if the ring component 11 is composed of standard piston ring steel such as S.A.E. 1095 and has been subjected to a tempering treatment at 650 F., the plastics packed ring may be heated up to this temperature. When the plastics component is Teflon a sintering of the packed material will occur at temperatures above 590 F.

In the case of true thermoplastic resins, the plastics material P.M. can be extruded at molding temperatures, for example, in the range of 500 to 625 F. The screw conveyor forces the amorphous or molten plastic material through the orifice 34 at sufficient pressures to insure filling of the channel 19 and all of the gaps 17, 18 and 20 in the ring. The shape of the crosshead 34 molds this plastic material to the exact contour of the finished plastics ring component 12. In the embodiment of FIGS. 4 and 5, this contour of the plastics ring does not extend beyond the confines of the ring 11.

A modified plastics-filled spacer-expander ring 10a of this invention shown in FIG. 6 may be provided with the same metal ring component 11 as the ring 10, but with a plastics ring component 12a which extends beyond the confines of the ring 11 into the inner periphery of this ring. The modified ring 10a serves the same function as the ring 10 being used in the second ring groove 25 of the piston P as shown in FIG. 6, but has an inner peripheral cover 40 of plastics material around the inner periphery thereof. The ring 10a is formed in the same crosshead or extrusion apparatus 31 of FIGS. 4 and 5, but as shown in FIGS. 7 and 8, the crosshead 35a of this apparatus is modified to have a flat bottom wall 41 with a groove 42 commencing opposite the orifice 34 to form a pocket which will mold the contour of the covering portion 40 of the plastics ring. This provides a continuous plastics ring portion inside of the periphery of the metal ring portion 11 which connects with the channel 19 of the ring through the gaps 20 between the legs 16. Thus, the plastics ring 12a is even more firmly locked to the metal ring 11 than the ring 12.

It will also be understood, of course, that bonding agents can be used to increase the anchor between the metal and plastic components of the rings of this invention. Thus, the metal ring component may previously be coated with a bonding agent before entering the crosshead extruder apparatus 31.

The further modified ring 10c, shown in FIGS. 12 and 13, is also provided by this invention. This ring 10c has a metal ring component 50 underlying and anchored to a plastics ring component 51. The ring component 50, as best shown in FIG. 9, is punched from a metal strip 52 by forming a plurality of circular punch holes 53, transverse cuts 54, longitudinal cuts 55 and curved cuts 56 through the strip. The transverse cuts 54 have axially offset ends 54a extending from the cuts 55 to longitudinal cuts 54b mating with cut portions 54c extending transversely to notched or grooved portions 57 which are connected at their bottoms, leaving a thin fracturable portion 58 joining segments 60 of the strip on opposite sides of the cuts 54.

The curved cuts 56 merge into a common cut 61 extending through the opposite edge of the strip 52. Bend lines 62 are illustrated in spaced parallel relation to the cuts 61. These cuts leave a connecting spring portion 63 between the segments 60. The punched holes 53 serve as terminal ends for the cuts 55 and 56. The portions of the strip bounded by the cuts 56 and 61 and by the fold lines 62 provide tabs 64, as best shown in FIGS. 10 and 11.

Thus, the ring 50 is composed of the radial segments 60 which are separated by gaps 65 provided by the cuts 54 and by fracturing the fracture line 58 at the ends of these cuts, and these segments 60 are joined through spring strips 63 connected to the tabs 64 through the bend lines 62. A circumferentially expansible spring ring is thus provided with radial segments only on one face thereof and with tabs depending axially from this face. The ring 10c is formed by molding the plastics ring 51 against the segments 60 and receiving the tabs 64 therein to provide anchoring members. The plastic flows through the holes 53 in these tabs to enhance the anchor lock.

As shown in FIG. 13, the ring 10c has the segments 60 of the metal ring component 50 riding on the bottom side wall of the ring groove 25, while the top face of the plastics ring 51 is under the top side wall of this ring groove. The metal segments 60 of the ring component 50 thus underly the portion of the plastic ring in the gap G between the piston and cylinder to protect the plastic against extrusion in the gap under the gas pressures in the gap above the ring groove 25. While the modified ring 10c has one metal face and one plastics face, the plastics material is thus protected against deformation.

Another modified ring 10d of this invention is illustrated in FIGS. 14 and 15 wherein two metal rings 50 are stacked with their tabs 64 in nested relation to form axial spacers providing a channel metal ring component 70 sandwiching a plastics ring component 71 with the segments 60 forming the side walls of the ring and with the tabs 64 extending across the channel and molded in the plastic. The modified ring 10d is thus like the ring 10c, but with a metal cover for the top face of the plastics material.

In all embodiments of the invention, the metal ring component is circumferentially expansible and loads the plastic ring component to cause it to conform with the cylinder wall in good sealing engagement. The metal component also protects the plastic component against deformation and extrusion.

The chart of FIG. 16 plots blowby in cubic feet per hour under variable speed and load conditions of a single piston internal combustion engine of about an 8 to 1 compression ratio having a 3.8 inch bore and a 3.75 inch stroke and compares the performance of the rings of this invention with a standard cast iron second compression ring under identical conditions. The designation W.O.T. in the chart indicates "wide open throttle." The tests were run in the same engine under identical conditions with the identical first compression and oil ring. The second ring groove of the piston was equipped with the standard cast iron second compression ring for one test and was then equipped with the ring 10 of FIGS. 1-3 of this invention for the second test. The standard ring results are shown in the plain unhatched pillars of the charts, while the results of the rings of this invention are shown by the crossed hatched pillars alongside these unhatched pillars. In The plastics filled ring 10 is heated to temperatures which do not exceed the temperatures at which the steel component 11 of the ring has been subjected in previous tempering treatment. For example, if the ring component 11 is composed of standard piston ring steel such as S.A.E. 1095 and has been subjected to a tempering treatment at 650° F., the plastics packed ring may be heated up to this temperature. When the plastics component is Teflon a sintering of the packed material will occur at temperatures above 590° F.

In the case of true thermoplastic resins, the plastics material P.M. can be extruded at molding temperatures, for example, in the range of 500° to 625° F. The screw conveyor forces the amorphous or molten plastic material through the orifice 34 at sufficient pressures to insure filling of the channel 19 and all of the gaps 17, 18 and 20 in the ring. The shape of the crosshead 34 molds this plastic material to the exact contour of the finished plastics ring component 12. In the embodiment of FIGS. 4 and 5, this contour of the plastics ring does not extend beyond the confines of the ring 11.

A modified plastics-filled spacer-expander ring 10a of this invention shown in FIG. 6 may be provided with the same metal ring component 11 as the ring 10, but with a plastics ring component 12a which extends beyond the confines of the ring 11 into the inner periphery of this ring. The modified ring 10a serves the same function as the ring 10 being used in the second ring groove 25 of the piston P as shown in FIG. 6, but has an inner peripheral cover 40 of plastics material around the inner periphery thereof. The ring 10a is formed in the same crosshead or extrusion apparatus 31 of FIGS. 4 and 5, but as shown in FIGS. 7 and 8, the crosshead 35a of this apparatus is modified to have a flat bottom wall 41 with a groove 42 commencing opposite the orifice 34 to form a pocket which will mold the contour of the covering portion 40 of the plastics ring. This provides a continuous plastics ring portion inside of the periphery of the metal ring portion 11 which connects with the channel 19 of the ring through the gaps 20 between the legs 16. Thus, the plastics ring 12a is even more firmly locked to the metal ring 11 than the ring 12.

It will also be understood, of course, that bonding agents can be used to increase the anchor between the metal and plastic components of the rings of this invention. Thus, the metal ring component may previously be coated with a bonding agent before entering the crosshead extruder apparatus 31.

The further modified ring 10c, shown in FIGS. 12 and 13, is also provided by this invention. This ring 10c has a metal ring component 50 underlying and anchored to a plastics ring component 51. The ring component 50, as best shown in FIG. 9, is punched from a metal strip 52 by forming a plurality of circular punch holes 53, transverse cuts 54, longitudinal cuts 55 and curved cuts 56 through the strip. The transverse cuts 54 have axially offset ends 54a extending from the cuts 55 to longitudinal cuts 54b mating with cut portions 54c extending transversely to notched or grooved portions 57 which are connected at their bottoms, leaving a thin fracturable portion 58 joining segments 60 of the strip on opposite sides of the cuts 54.

The curved cuts 56 merge into a common cut 61 extending through the opposite edge of the strip 52. Bend lines 62 are illustrated in spaced parallel relation to the cuts 61. These cuts leave a connecting spring portion 63 between the segments 60. The punched holes 53 serve as terminal ends for the cuts 55 and 56. The portions of the strip bounded by the cuts 56 and 61 and by the fold lines 62 provide tabs 64, as best shown in FIGS. 10 and 11.

Thus, the ring 50 is composed of the radial segments 60 which are separated by gaps 65 provided by the cuts 54 and by fracturing the fracture line 58 at the ends of these cuts, and these segments 60 are joined through spring strips 63 connected to the tabs 64 through the bend lines 62. A circumferentially expansible spring ring is thus provided with radial segments only on one face thereof and with tabs depending axially from this face. The ring 10c is formed by molding the plastics ring 51 against the segments 60 and receiving the tabs 64 therein to provide anchoring members. The plastic flows through the holes 53 in these tabs to enhance the anchor lock.

As shown in FIG. 13, the ring 10c has the segments 60 of the metal ring component 50 riding on the bottom side wall of the ring groove 25, while the top face of the plastics ring 51 is under the top side wall of this ring groove. The metal segments 60 of the ring component 50 thus underly the portion of the plastic ring in the gap G between the piston and cylinder to protect the plastic against extrusion in the gap under the gas pressures in the gap above the ring groove 25. While the modified ring 10c has one metal face and one plastics face, the plastics material is thus protected against deformation.

Another modified ring 10d of this invention is illustrated in FIGS. 14 and 15 wherein two metal rings 50 are stacked with their tabs 64 in nested relation to form axial spacers providing a channel metal ring component 70 sandwiching a plastics ring component 71 with the segments 60 forming the side walls of the ring and with the tabs 64 extending across the channel and molded in the plastic. The modified ring 10d is thus like the ring 10c, but with a metal cover for the top face of the plastics material.

In all embodiments of the invention, the metal ring component is circumferentially expansible and loads the plastic ring component to cause it to conform with the cylinder wall in good sealing engagement. The metal component also protects the plastic component against deformation and extrusion.

The chart of FIG. 16 plots blowby in cubic feet per hour under variable speed and load conditions of a single piston internal combustion engine of about an 8 to 1 compression ratio having a 3.8 inch bore and a 3.75 inch stroke and compares the performance of the rings of this invention with a standard cast iron second compression ring under identical conditions. The designation W.O.T. in the chart indicates "wide open throttle." The tests were run in the same engine under identical conditions with the identical first compression and oil ring. The second ring groove of the piston was equipped with the standard cast iron second compression ring for one test and was then equipped with the ring 10 of FIGS. 1–3 of this invention for the second test. The standard ring results are shown in the plain unhatched pillars of the charts, while the results of the rings of this invention are shown by the crossed hatched pillars alongside these unhatched pillars. In each instance, the blowby from the standard ring equipped piston was much greater than from the piston equipped with the ring of this invention.

As shown on the chart, for example, at an RPM of 4,000 under wide open throttle conditions, the blowby allowed by the ring of this invention is less than half of that allowed by the prior art ring. The blowby comparison under a no-load conditions at 3,500 RPM is even more significant with the ring of this invention permitting only about one-fifth of the blowby allowed by the prior art ring.

The chart of FIG. 16 thus clearly illustrates that the rings of this invention afford excellent blowby control for internal combustion engines, thereby minimizing oil oxidation and reducing pollutant emissions.

I claim as my invention;

1. A piston ring comprising a metal, one piece, radially opening channel shaped, circumferentially expansible ring component with circumferentially spaced portions and an elastomeric plastics ring component embedding said portions anchored to the metal ring component and providing a peripheral sealing surface for riding on a cylinder wall in a piston and cylinder assembly.

2. The piston ring of claim 1 wherein the elastomeric plastic is selected from the group consisting of fluorocarbon, aromatic polyimide and silicone resins retaining their integrity under conditions obtaining in an engine piston and cylinder assembly.

3. The piston ring of claim 1 wherein the elastomeric plastics material is polytetrafluoroethylene.

4. A piston ring adapted for the second ring groove of an internal combustion engine piston and cylinder assembly which comprises a one-piece, radially opening channel shaped, circumferentially expansible metal ring having circumferentially separated segments and an elastomeric plastics material ring receiving said segments in embedded relation and integrally anchored to the metal ring and providing a peripheral cylinder wall sealing surface resiliently loaded by the metal ring to conform with and ride on the cylinder wall.

5. The piston ring of claim 4 wherein the metal ring has circumferentially spaced radially extending segments connected by circumferentially spaced legs on the inner periphery of the ring and the plastics material fills all of the voids between the legs and segments.

6. An integrated metal and plastics compression ring for internal combustion engine pistons which comprises a one-piece, radially opening channel shaped, circumferentially expansible metal ring having circumferentially separated radially extending segments, and an elastomeric plastics ring integrally anchored to said metal ring and extending between the segments to seal the gaps therebetween with the segments of the metal ring forming at least one lateral side face of the plastics ring and bridging the gap between the piston and the cylinder in an internal combustion engine piston and cylinder assembly to protect the plastic ring against deformation.

7. A second compression ring for an internal combustion engine piston which comprises a metal one-piece, radially opening channel shaped, circumferentially expansible outwardly opening channel ring composed of circumferentially separated radially extending segments having gaps therebetween providing axially spaced cylinder wall confronting peripheral edges, and an elastomeric plastics ring filling the channel of the metal ring and the gaps between the segments in firmly anchored relation to the metal ring and providing a peripheral sealing surface between the peripheral edges of the metal ring for riding on the cylinder wall of a piston and cylinder assembly.

8. The piston ring of claim 7 wherein the plastics ring extends beyond the inner periphery of the metal ring.

9. A piston ring comprising a metal circumferentially expansible ring component and an elastomeric plastics ring component anchored to the metal component and providing a peripheral surface for riding on a cylinder wall in a piston and cylinder assembly, said metal ring component being a channel ring with top and bottom rows of circumferentially spaced radial segments connected by upstanding spring legs spaced circumferentially around the inner periphery of the ring and said plastics ring component filling the channel and the gaps between the segments and legs.

10. The ring of claim 9 wherein the plastics ring component is flush with the outer surfaces of the metal ring component.

11. A piston ring comprising a metal circumferentially expansible ring component and an elastomeric plastics ring component anchored to the metal ring component and providing a peripheral sealing surface for riding on a cylinder wall in a piston and cylinder assembly, said metal ring component having circumferentially spaced radial segments underlying the plastics ring component and said segments having upstanding tabs embedded in the plastics ring component.

12. A piston ring comprising a metal ring component and an elastomeric plastics ring component anchored to the metal ring component and providing a peripheral sealing surface for riding on a cylinder wall in a piston and cylinder assembly, said metal ring component being comprised of two axially spaced one-piece circumferentially expansible rings forming the top and bottom of the piston ring and tabs on each axially spaced ring embedded in the plastics ring component.

* * * * *

UNITED STATES PATENT OFFICE
CERTIFICATE OF CORRECTION

Patent No. 3,697,090　　　Dated October 10, 1972

Inventor(s) Arthur M. Brenneke

It is certified that error appears in the above-identified patent and that said Letters Patent are hereby corrected as shown below:

Column 4, line 12, cancel "grater" and insert --greater--.

Cancel all of columns 7 and 8.

Signed and sealed this 13th day of August 1974.

(SEAL)
Attest:

McCOY M. GIBSON, JR.　　　C. MARSHALL DANN
Attesting Officer　　　　　Commissioner of Patents